United States Patent
Ezaki

(10) Patent No.: US 8,428,639 B2
(45) Date of Patent: Apr. 23, 2013

(54) METHOD FOR CONTROLLING AN UPLINK POWER IN A WIRELESS COMMUNICATION SYSTEM AND AN APPARATUS IN THE SYSTEM

(75) Inventor: Takato Ezaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 78 days.

(21) Appl. No.: 12/787,631

(22) Filed: May 26, 2010

(65) Prior Publication Data
US 2010/0240387 A1 Sep. 23, 2010

Related U.S. Application Data

(63) Continuation of application No. PCT/JP2007/074501, filed on Dec. 20, 2007.

(51) Int. Cl.
*H04B 7/00* (2006.01)

(52) U.S. Cl.
USPC .............................. 455/522; 455/68; 455/69

(58) Field of Classification Search .............. 455/522, 455/67.11, 68–70, 115.3, 126, 127.1, 296; 370/318
See application file for complete search history.

(56) References Cited

U.S. PATENT DOCUMENTS

| | | | |
|---|---|---|---|
| 6,044,067 A | 3/2000 | Suzuki | |
| 6,259,927 B1 * | 7/2001 | Butovitsch et al. | 455/522 |
| 6,628,924 B1 * | 9/2003 | Miyamoto | 455/69 |
| 6,947,735 B2 * | 9/2005 | Jung et al. | 455/423 |
| 7,145,895 B2 * | 12/2006 | Mueckenheim et al. | 370/348 |
| 7,164,916 B1 * | 1/2007 | Ahnlund et al. | 455/437 |
| 7,406,096 B2 * | 7/2008 | El-Maleh et al. | 370/466 |
| 7,421,248 B1 * | 9/2008 | Laux et al. | 455/67.11 |
| 7,437,156 B2 * | 10/2008 | Tanno et al. | 455/434 |
| 7,454,222 B2 * | 11/2008 | Huang et al. | 455/522 |
| 8,072,918 B2 * | 12/2011 | Muharemovic et al. | 370/319 |
| 8,229,008 B2 * | 7/2012 | Jones et al. | 375/260 |
| 2002/0077111 A1 * | 6/2002 | Spaling et al. | 455/453 |
| 2003/0017830 A1 * | 1/2003 | Kayama et al. | 455/450 |

(Continued)

FOREIGN PATENT DOCUMENTS

| | | |
|---|---|---|
| JP | 10-65604 | 3/1998 |
| JP | 2004-207839 | 7/2004 |
| JP | 2006-352643 | 12/2006 |
| WO | 2006-087797 | 8/2006 |

OTHER PUBLICATIONS

3GPP TS 25.433 V7.5.0 (Jun. 2007); 3rd Generation Partnership Project; Technical Specification Group Radio Access Network; "UTRAN Iub interface Node B Application Part (NBAP) signalling"; (Release 7); Dated Jun. 2007.

(Continued)

*Primary Examiner* — Dominic E Rego
(74) *Attorney, Agent, or Firm* — Myers Wolin, LLC

(57) ABSTRACT

In a wireless communication system including a wireless terminal, a first wireless base station, a second wireless base station which supports a wireless channel which is not supported by the first wireless base station and an upper level apparatus which accommodates the wireless base stations, the upper level apparatus monitors interference power in the wireless base station and carries out, where a result of the monitoring exceeds a predetermined threshold value, suppression control of transmission power of the wireless terminal which communicates with the second wireless base station using the wireless channel which is not supported by the first wireless base station.

16 Claims, 14 Drawing Sheets

U.S. PATENT DOCUMENTS

| | | | |
|---|---|---|---|
| 2003/0032431 A1* | 2/2003 | Chang | 455/438 |
| 2004/0008630 A1* | 1/2004 | Corson et al. | 370/241 |
| 2004/0071117 A1* | 4/2004 | Jung et al. | 370/335 |
| 2004/0081248 A1* | 4/2004 | Parolari | 375/259 |
| 2004/0127191 A1 | 7/2004 | Matsunaga | |
| 2005/0018656 A1* | 1/2005 | Rudolf et al. | 370/352 |
| 2005/0277419 A1* | 12/2005 | Takano et al. | 455/442 |
| 2006/0165032 A1* | 7/2006 | Hamalainen et al. | 370/328 |
| 2007/0004416 A1 | 1/2007 | Nishimura et al. | |
| 2007/0066329 A1* | 3/2007 | Laroia et al. | 455/502 |
| 2007/0173261 A1* | 7/2007 | Priotti et al. | 455/450 |
| 2007/0197254 A1* | 8/2007 | Borran et al. | 455/522 |
| 2007/0258411 A1* | 11/2007 | Trigui | 370/335 |
| 2007/0280170 A1 | 12/2007 | Kawasaki | |
| 2008/0045259 A1* | 2/2008 | Shen et al. | 455/522 |
| 2008/0081655 A1* | 4/2008 | Shin et al. | 455/522 |
| 2009/0088146 A1* | 4/2009 | Wigren et al. | 455/423 |
| 2010/0027502 A1* | 2/2010 | Chen et al. | 370/330 |
| 2010/0093363 A1* | 4/2010 | Malladi | 455/452.2 |
| 2010/0105406 A1* | 4/2010 | Luo et al. | 455/452.2 |
| 2010/0303030 A1* | 12/2010 | Andersson | 370/329 |
| 2011/0228690 A1* | 9/2011 | Corson et al. | 370/252 |

OTHER PUBLICATIONS

3GPP TS 25.215 V7.2.0 (May 2007); 3rd Generation Partnership Project; Technical Specification Group Radio Access Network; Physical layer—Measurements (FDD); Dated May 2007.

International Search Report for corresponding International Patent Application No. PCT/JP2007/074501, mailed Apr. 1, 2008.

* cited by examiner

US 8,428,639 B2

METHOD FOR CONTROLLING AN UPLINK POWER IN A WIRELESS COMMUNICATION SYSTEM AND AN APPARATUS IN THE SYSTEM

CROSS-REFERENCE TO RELATED APPLICATION

This application is a continuation Application of a PCT international application No. PCT/JP2007/074501 filed on Dec. 20, 2007 in Japan, the entire contents of which are incorporated by reference.

FIELD

The embodiments discussed herein are related to a method for controlling an uplink power in a wireless communication system and an apparatus in the system.

BACKGROUND ART

In 3rd Generation Partnership Project (3GPP), High Speed Uplink Packet Access (HSUPA) is prescribed in order to achieve high speed packet communication of an uplink (UL) which is a direction from a mobile station (UE: User Equipment) to a wireless base station (Node-B). It is to be noted HSUPA is sometimes called Enhanced UpLink (EUL) in order to avoid possible confusion with High Speed Downlink Packet Access (HSDPA).

In EUL, there is a tendency that the instant transmission power of the UE becomes higher in order to enhance the transmission rate of the uplink. Therefore, there is a tendency that also the interference power between neighboring cells in a cellular system becomes higher.

Therefore, between cells (Node-B) for supporting EUL, several means for suppressing the interference level of a UE positioned in the proximity of a boundary of a cell may be provided on the network level.

For example, in Patent Document 1 specified hereinbelow, a base station is disclosed which carries out communication with a mobile terminal existing in a subordinate cell and carries out control for reducing the interference from mobile terminals existing in neighboring cells.

The base station measures the total interference power received from mobile terminals in all of the neighboring cells, and transmits, if the total interference power is higher than a preset value, a request for reducing the interference to the base stations of all of the neighboring cells.

Each of the base stations receiving this interference reduction request discriminates mobile terminals which may possibly apply the interference to the base station of the requesting source and temporarily decreases the transmission rate of upward data of the mobile terminals or temporarily stops transmission of upward data to reduce the interference.

Patent Document 1: pamphlet of International Publication No. WO2006/087797

However, in the conventional technique described above, it is premised that both base stations (Node-B) which provide neighboring cells with each other support communication by EUL and each of the base stations can identify all of wireless channels prescribed by EUL and besides the total interference power of the UL can be measured by the individual neighboring base stations in regard to all neighboring cells.

In particular, the conventional technique does not anticipate a case wherein an EUL supporting base station and an EUL non-supporting base station which does not support part or all of wireless channels additionally prescribed by EUL exist in neighboring cells. Such a mixture configuration as just described may possibly appear within a transition period of system switchover from an old to a new system.

SUMMARY (1) According to an aspect of the embodiments, a method includes a method for controlling an uplink power in a wireless communication system which includes a wireless terminal, a first wireless base station, a second wireless base station which supports a wireless channel which is not supported by the first wireless base station, and an upper level apparatus which accommodates the first and second wireless base stations, the method including: on the upper level apparatus, monitoring interference power in the first wireless base station, and carrying out, where a result of the monitoring exceeds a predetermined threshold value, suppression control of transmission power of the wireless terminal which communicates with the second wireless base station using the wireless channel which is not supported by the first wireless base station.

(2) According to an aspect of the embodiments, an apparatus includes an apparatus in a wireless communication system which includes a wireless terminal, a first wireless base station, a second wireless base station which supports a wireless channel which is not supported by the first wireless base station, and the apparatus which accommodates the first and second wireless base stations, the apparatus including: an interference power monitoring unit that monitors interference power in the first wireless base station, and a controlling unit that carries out, where a result of the monitoring by the interference power monitoring unit exceeds a predetermined threshold value, suppression control of transmission power of the wireless terminal which communicates with the second wireless base station using the wireless channel which is not supported by the first wireless base station.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Hereinafter, embodiments will be described with reference to the drawings. Note that the embodiments are not limited to the embodiments to be described below, but may be modified in various ways without departing from sprits and scope of the embodiments, as a matter of course.

[1] Description of an Embodiment

Figure 1:
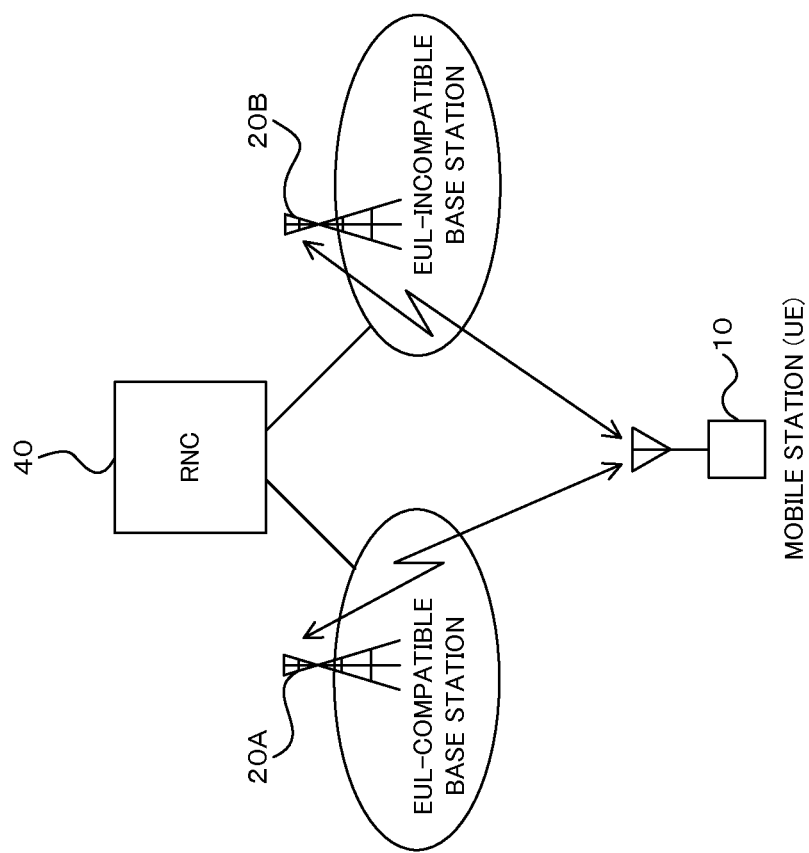
FIG. 1 is a schematic view illustrating a configuration of a wireless communication system according to an embodiment.

FIG. 1 is a view illustrating a configuration of a wireless communication system according to the embodiment of the present invention. The system illustrated in FIG. 1 includes, for example, at least one mobile station (user terminal (UE: User Equipment)) 10, at least one wireless base station (Node-B) 20A which supports EUL, at least one wireless base station (Node-B) 20B which does not support EUL and a wireless network controlling apparatus (RNC: Radio Network Controller) 40 ranked as an upper level apparatus which accommodates the wireless base stations 20A and 20B.

It is to be noted that the wireless base station 20A which supports EUL and the wireless base station 20B which does not support EUL are sometimes referred to as EUL-compatible base station 20A and EUL-incompatible base station 20B, respectively, and the wireless base stations 20A and 20B are sometimes referred to simply as base stations 20 where the wireless base stations 20A and 20B are not distinguished from each other.

Where the UE 10 is positioned within a wireless zone (wireless service area) formed by one of the wireless base stations 20A and 20B, the UE 10 can establish a connection to the wireless base station 20A or 20B with a wireless link to communicate with a different UE or a communication apparatus such as a server apparatus disposed in a core network (not illustrated) such as the Internet through the RNC 40.

The wireless zone is divided into a plurality of cells such as, for example, three or six cells, and a frequency, time (transmission and reception timings), and a wireless resource such as a CDMA code to be used by the UE 10 can be allocated in a unit of a cell. The allocation is carried out in response to the number of base stations and a physical arrangement relationship of the base stations such that the limited wireless resources can be effectively utilized as much as possible while avoiding interference.

Further, a channel of the uplink (UL) which is a link in a direction from the UE 10 to the base station 20 and another channel of the downlink (DL) which is a link in the opposite direction to the uplink are included in the wireless link. Then, in EUL, a transport channel called Enhanced Dedicated Channel (E-DCH) is newly defined in addition to the existing channels. For example, an E-HICH, an E-RGCH, an E-AGCH and so forth are included in physical channels of the DL in EUL, and an E-DPCCH, an E-DPDCH and so forth are included in physical channels of the UL in EUL.

Here, the E-HICH is an abbreviated name of the Enhanced Dedicated Channel (E-DCH) Hybrid Automatic Repeat reQuest (ARQ) Indicator Channel and is a common channel used by the EUL-compatible base station 20A to notify the UE 10 of a result of reception (ACK/NACK) regarding UL data.

The E-RGCH is an abbreviated name of the E-DCH Relative Grant Channel and is a common channel used by the UE 10 to notify the EUL-compatible base station 20A of transmission power (that is, a transmission rate) which can be used for transmission by a data channel (for example, E-DPDCH) in the form of a relative value with respect to the present value (for instructing the EUL-compatible base station 20A of decrease, increase or maintenance of a transmission rate).

The E-AGCH is an abbreviated name of the E-DCH Absolute Grant Channel and is a common channel used by the UE 10 to notify the EUL-compatible base station 20A of maximum power (a maximum transmission rate) which can be used for transmission by a data channel (for example, an E-DPDCH) in the form of an absolute value.

The E-DPDCH is an abbreviated name of the E-DCH Dedicated Physical Data Channel and is an individual channel used by the UE 10 to notify the EUL-compatible base station 20A for data transmission. The E-DPCCH is an abbreviated name of the E-DCH Dedicated Physical Control Channel and is an individual channel used for transmission of controlling information (transmission format, sequence number of retransmission and so forth) regarding E-DPDCH transmission from the UE 10 to the EUL-compatible base station 20A.

It is to be noted that, while the signals of the channels in EUL are identified by the EUL-compatible base station 20A and modulation and demodulation processes and encoding and decoding processes are carried out for the signals, in the EUL-incompatible base station 20B, the signals are not identified and modulation and demodulation processes and encoding and decoding processes are not carried out for the signals, either. Accordingly, even if a signal of a channel of the UL in EUL reaches the EUL-incompatible base station 20B from the UE 10, the signal may be regarded as a noise component (interference power) in the EUL-incompatible base station 20B.

In other words, the EUL-incompatible base station 20B is ranked as a first wireless base station which does not support the wireless channel of EUL, but the EUL-compatible base station 20A is ranked as a second wireless base station which supports the wireless channel of EUL which is not supported by the base station 20B. Then, cells obtained by dividing the wireless zone formed by the first wireless base station 20B are ranked as first cells and cells obtained by dividing the wireless zone formed by the second wireless base station 20A are ranked as second cells.

Figure 2:
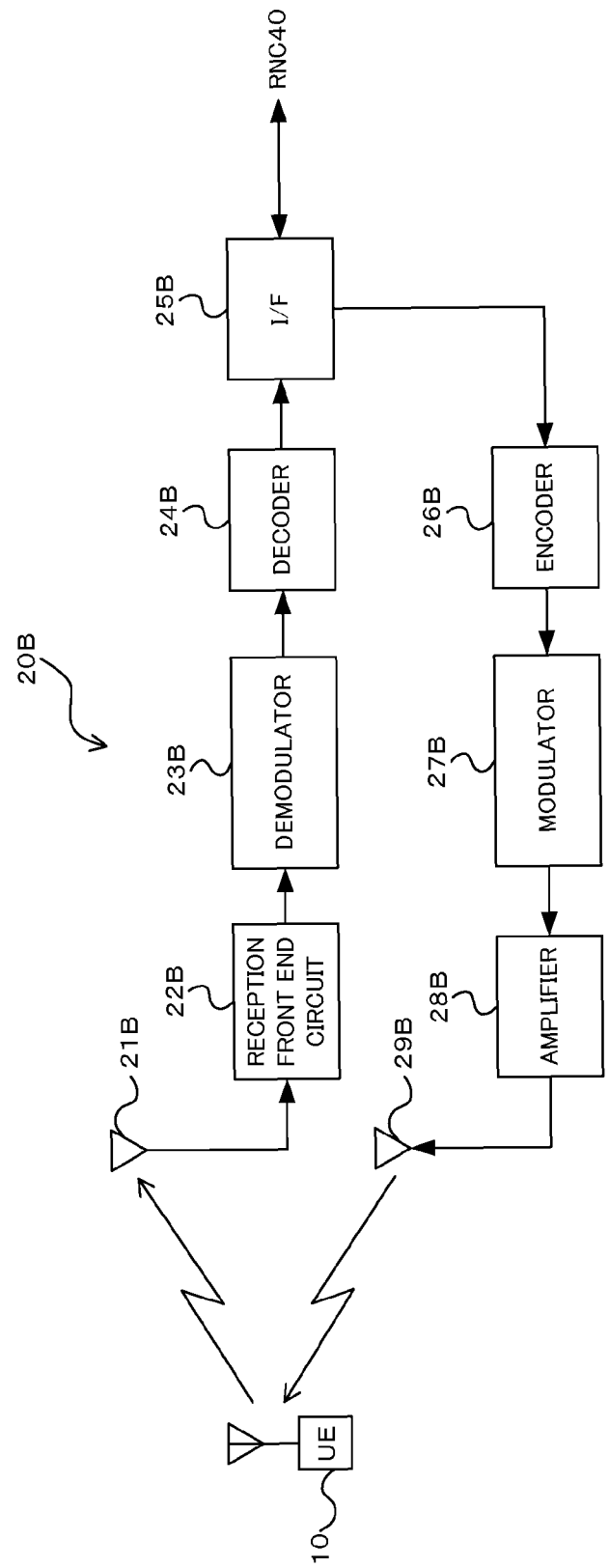
FIG. 2 is a block diagram illustrating an example of a configuration of a wireless base station which is not compatible with EUL illustrated in FIG. 1.
Figure 3:
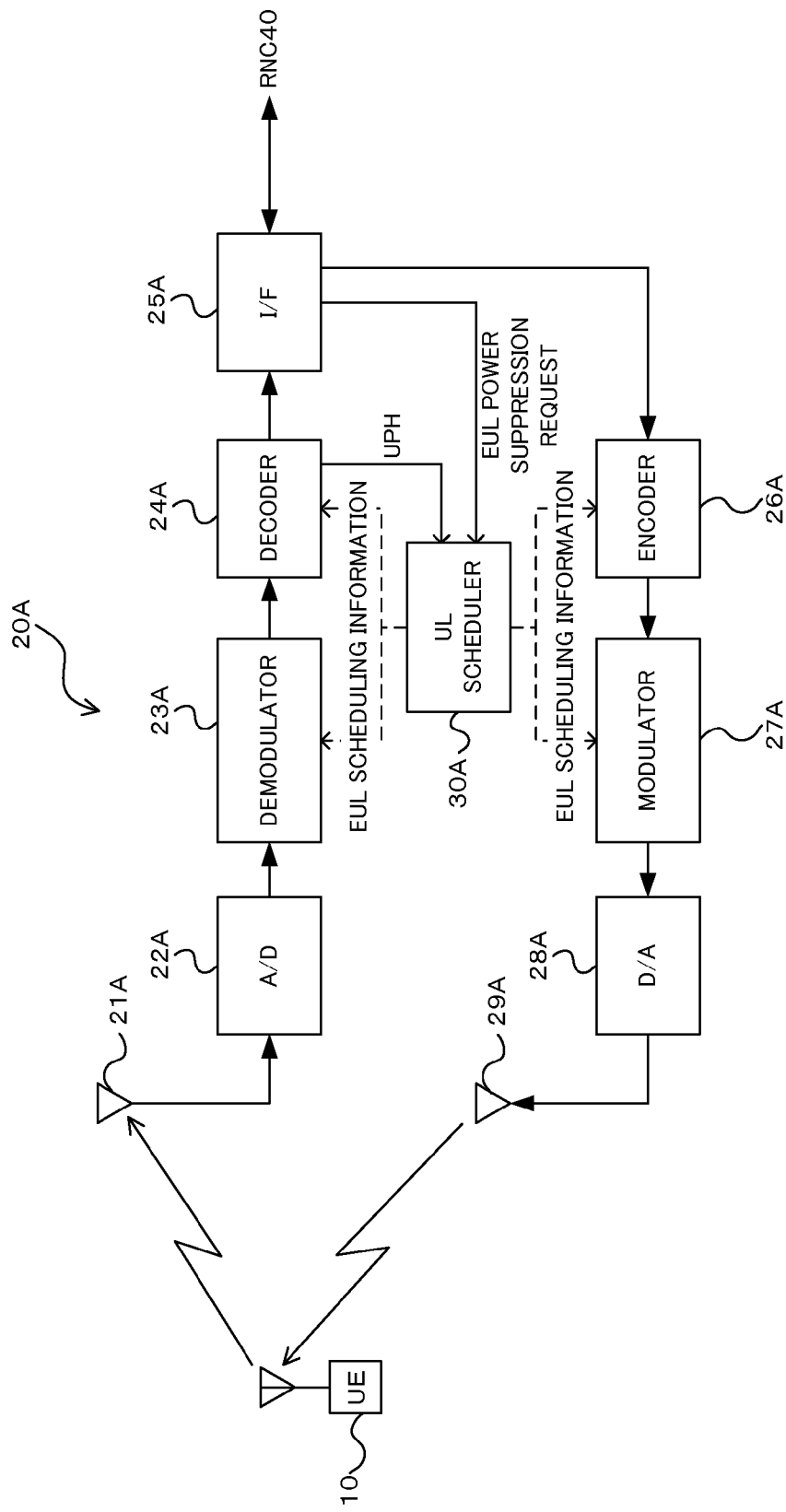
FIG. 3 is a block diagram illustrating an example of a configuration of a wireless base station which is compatible with EUL illustrated in FIG. 1.
Figure 4:
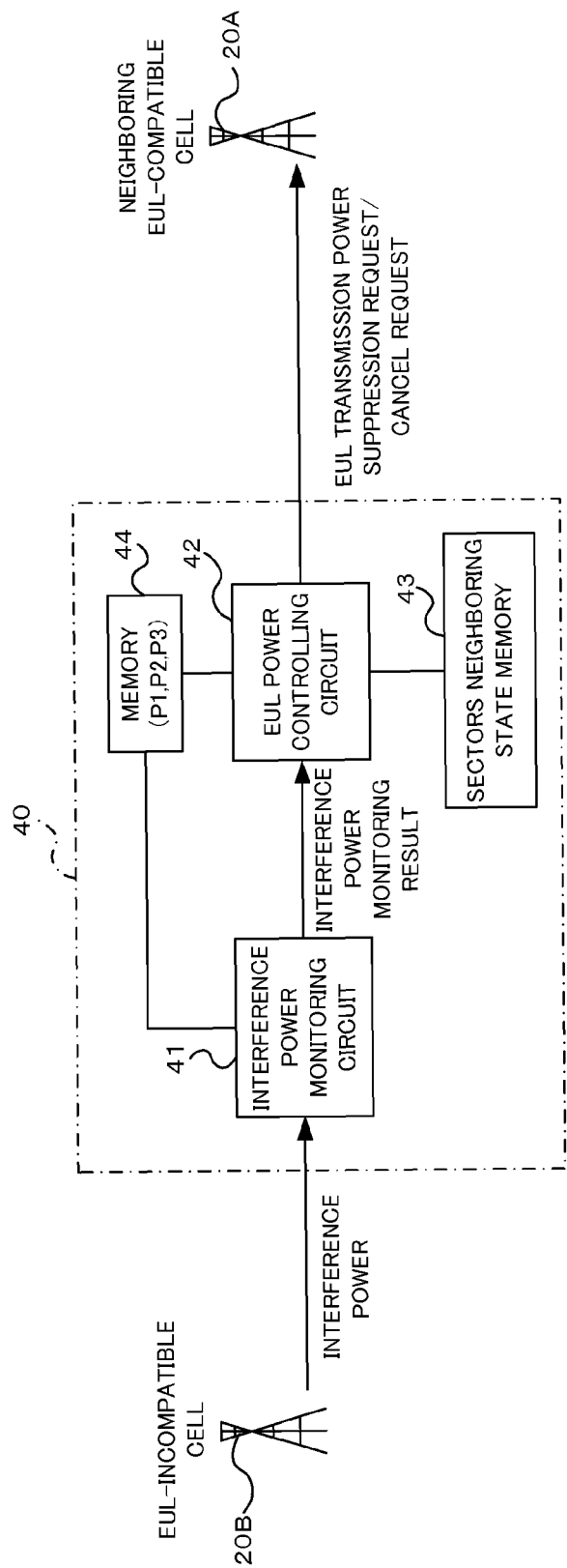
FIG. 4 is a block diagram illustrating an example of a configuration of a wireless network controlling apparatus (RNC) illustrated in FIG. 1.

An example of a configuration of the EUL-incompatible base station 20B is illustrated in FIG. 2. An example of a configuration of the EUL-compatible base station 20A is illustrated in FIG. 3. An example of a configuration of the RNC 40 is illustrated in FIG. 4.

(EUL-Incompatible Base Station)

As illustrated in FIG. 2, the EUL-incompatible base station 20B includes, for example, a reception antenna 21B, a reception front end circuit 22B, a demodulator 23B, a decoder 24B, an interface (I/F) 25B, an encoder 26B, a modulator 27B, an amplifier 28B, and a transmission antenna 29B.

The reception antenna 21B receives a wireless signal of the UL transmitted from a UE 10, and the reception front end circuit 22B has a function for carrying out reception processes such as low-noise amplification, frequency conversion (down convert) into the base band frequency, A/D conversion, band limitation by a filter and so forth for the signal received by the reception antenna 21B.

The demodulator 23B has a function for demodulating the reception base band signal obtained by the reception front end circuit 22B with a demodulation method compatible with a modulation method (QPSK, 16QAM or the like) on the transmission side (UE 10).

The decoder 24B decodes (error correction decodes) the signal demodulated by the demodulator 23B with a decoding method compatible with an encoding method on the transmission side (UE 10).

The interface 25B has an interface function with the RNC 40, and transmits decoded data obtained by the decoder 24B to the RNC 40 and transmits data (data of the DL) for the UE 10 received from the RNC 40 to the encoder 26B.

The encoder 26B encodes (error correction encodes) the data of the DL from the interface 25B with a predetermined encoding method, and the modulator 27B modulates the encoded data obtained by the encoder 26B with a predetermined modulation method such as QPSK, 16QAM or the like.

The amplifier 28B amplifies the modulation signal obtained by the modulator 27B to predetermined transmission power, and the transmission antenna 29B transmits the signal after the amplification by the amplifier 28B toward the wireless service area. It is to be noted that, in FIG. 2, illustration of a D/A converter for converting a modulation signal into an analog signal and a frequency converter for carrying out frequency conversion (up convert) into a wireless frequency is omitted. Further, the reception antenna 21B and the transmission antenna 29B may be integrated as a single transmission and reception antenna.

In the EUL-incompatible base station 20B configured in such a manner as described above, if a UL signal is received by the reception antenna 21B, then a predetermined reception process is carried out for the signal by the reception front end circuit 22B and then demodulation by the demodulator 23B and decoding by the decoder 24B are carried out for the signal. Then, the resulting signal is transmitted to the RNC 40 through the interface 25B.

On the other hand, if DL data for the UE 10 from the RNC 40 is received by the interface 25B, then encoding by the encoder 26B and modulation by the modulator 27B are carried out for the data and then amplification to predetermined transmission power is carried out for the data by the amplifier 28B. Then, the resulting data is transmitted from the transmission antenna 29B toward the UE 10.

(EUL-Compatible Base Station)

Referring to FIG. 3, the EUL-compatible base station 20*a* includes, for example, a reception antenna 21A, an A/D converter 22A, a demodulator 23A, a decoder 24A, an interface (I/F) 25A, an encoder 26A, a modulator 27A, a D/A converter 28A, a transmission antenna 29A, and an UL scheduler 30A.

The reception antenna 21A receives a wireless signal of the UL transmitted from a UE 10, and the A/D converter 22A converts the reception signal into a digital signal. It is to be noted, however, that, in FIG. 3, illustration of a low-noise amplifier for amplifying a reception wireless signal with low noise, a frequency converter for carrying out frequency conversion (down convert) into a base band frequency and so forth is omitted.

The demodulator 23A demodulates the reception base band signal (digital signal) obtained by the A/D converter 22A in accordance with a scheduling result (EUL scheduling information) of the UL by the UL scheduler 30A.

The decoder 24A decodes (error correction decodes) the demodulation signal obtained by the demodulator 23A in accordance with the EUL scheduling information applied from the UL scheduler 30A.

The interface 25A has an interface function with the RNC 40, and while transmitting the decoded data obtained by the decoder 24A to the RNC 40, the interface 25A transmits data (data of the DL) for the UE 10 received from the RNC 40 to the encoder 26A. However, the interface 25A in the present embodiment has a detection function of an EUL power suppression request signal from the RNC 40 and can transfer the EUL power suppression request signal to the UL scheduler 30A.

The encoder 26A encodes the data of the DL from the interface 25A and control information (including the EUL scheduling information) for the UE 10 produced by the UL scheduler 30A with a predetermined encoding method, and the modulator 27A modulates the encoded data obtained by the encoder 26A with a predetermined modulation method such as QPSK, 16QAM or the like specified based on the EUL scheduling information.

The D/A converter 28A converts the digital modulation signal obtained by the modulator 27A into an analog signal, and the transmission antenna 29A transmits the signal after the D/A conversion by the D/A converter 28A toward the wireless service area. However, in FIG. 3, illustration of a frequency converter for carrying out frequency conversion (up convert) into a radio frequency for a modulation signal, an amplifier for carrying out amplification to predetermined transmission power and so forth are omitted. Further, the reception antenna 21A and the transmission antenna 29A may be integrated as a single transmission and reception antenna.

The UL scheduler 30A carries out scheduling of the UL (selection of a UE 10 to which the Grant is to be transmitted, allocation of transmission power (rate) of the selected UE 10 and so forth) in response to reception of scheduling requests transmitted from the UEs 10. It is to be noted that a known rule can be applied to the scheduling rule. Further, a result of the scheduling is applied to the encoder 26A and the modulator 27A as described above in order to transmit the result of the scheduling to the UE 10 with the physical channel such as the E-AGCH, E-RGCH or the like.

Further, if the EUL power suppression request signal is detected by the interface 25A, then the UL scheduler 30A in the present embodiment carries out scheduling for decreasing the transmission power of the UE 10 positioned in a cell of the station 20A in accordance with the detected information. Consequently, the interference power with the EUL-incompatible base station 20B arising from the EUL can be suppressed.

It is to be noted that the UE 10 which is a target of the transmission power suppression control may be all of the UEs 10 positioned in the cells of the station 20A itself irrespective of the distance from a cell end (distance to the EUL-incompatible base station 20B) under the control of the RNC 40 as hereinafter described. Or, the UE 10 which is a target of the transmission power suppression control may be a specific UE 10 selected from the UEs 10 positioned in the cells of the station 20A, for example, a UE 10 estimated as a UE 10 which applies high interference power to the EUL-incompatible base station 20B such as a UE 10 positioned in the proximity of a cell end (in the proximity of the boundary with the cell of the EUL-incompatible base station 20B) of the station 20A. As the estimation method, for example, a technique may be used wherein the pilot transmission power is measured utilizing a UPH (UE power headroom) reported from the UE 10 and it is decided that the UE 10 is positioned nearer to the cell end as the result of the measurement becomes higher.

In the EUL-compatible base station 20A configured in such a manner as described above, if a signal of the UL is received by the reception antenna 21A, then the signal is converted into a digital signal by the A/D converter 22A and demodulation and decoding are carried out for the converted signal by the demodulator 23A and the decoder 24A, respectively, in accordance with the scheduling information. Then, the resulting signal is transmitted to the RNC 40 through the interface 25A.

On the other hand, if data of the DL for the UE 10 from the RNC 40 is received by the interface 25A, or if EUL scheduling information is generated by the UL scheduler 30A, then the data or the information is encoded and modulated by the encoder 26A and the modulator 27A, respectively, and is converted into an analog signal by the D/A converter 28A. Then, the resulting data or the resulting information is transmitted from the transmission 10A to the UE 10 positioned in the cell of the station 20A.

The EUL scheduling information includes a result where, when the EUL power suppression request signal is detected by the interface 25A, scheduling for decreasing the transmission power of a channel of the EUL is carried out by the UL scheduler 30A as described above, and a notification of the information is transmitted to the UE 10.

(RNC)

Now, the RNC 40 is described. Referring to FIG. 4, the RNC 40 in the present embodiment includes, for example, an interference power monitoring circuit 41, an EUL power controlling circuit 42, a sectors neighboring state memory 43, and a memory 44.

Here, the interference power monitoring circuit (interference power monitoring unit) 41 has a function for monitoring interference power in the EUL-incompatible base station 20B, a function for comparing the interference power and a predetermined threshold value (interference power threshold value P1 or interference suppression cancellation threshold value P2 (<P1)) with each other, a function for controlling (managing) an operation mode (normal mode or interference suppression mode) in accordance with a result of the comparison and a guard timer function for providing a guard period within which monitoring of the interference power is not carried out.

The threshold values P1 and P2 are stored, for example, in the memory 44. The monitoring of the interference power can be carried out, for example, based on reception power information periodically reported from the EUL-incompatible base station 20B. As the reception power information, for example, "Received Total Wideband Power" prescribed by 3GPP TS 25.215 V7.2.0 (2007-05), section 5.2.1 can be used. "Received Total Wideband Power" indicates total reception power of the cells in the base station 20 and is reported in a fixed interval from the base station 20 to the RNC 40. A measurement function of the "Received Total Wideband Power" is a function normally provided on the existing base stations, and, by using the measurement function for interference power monitoring, the interference power monitoring can be implemented without changing the functional configuration of the existing base stations.

The EUL power controlling circuit 42, sectors neighboring state memory 43 and memory 44 have a function as a controlling section for suppression controlling, where a result of the interference power monitoring by the interference power monitoring circuit 41 exceeds the predetermined interference power threshold value P1, the transmission power of any UE 10 which communicates with the EUL-compatible base station 20A using a wireless channel of the EUL which is not supported by the EUL-incompatible base station 20B. It is to be noted that the suppression control includes a controlling process for stopping transmission of the UL of the UE 10.

Therefore, the sectors neighboring state memory 43 in the present embodiment stores information (neighboring cell information) regarding a neighboring situation of the cells of the base station 20 subordinate to the RNC 40. It is to be noted that the term neighboring cells signifies cells which transmit and receive a same carrier (frequency) to and from a certain cell and physically neighbor with each other.

Figure 5:
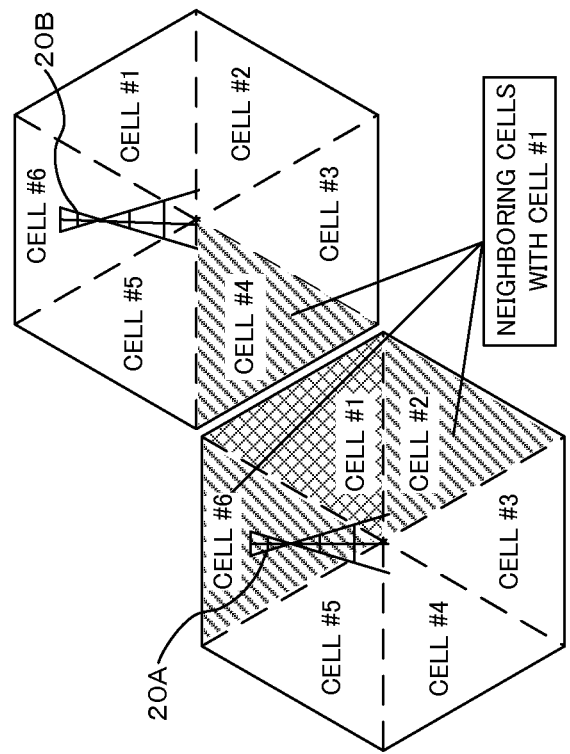
FIG. 5 is a schematic view illustrating a concept of neighboring cells in the wireless communication system illustrated in FIG. 1.

For example, as schematically illustrated in FIG. 5, where it is assumed that each of the wireless zones of the two base station 20A and 20B is divided into six cells (#1 to #6), those cells which neighbor with the cell #1 of the base station 20A are the cells #2 and #6 of the base station 20A and the cell #4 of the base station 20B, and such a neighboring relationship as just described is stored in the memory 43.

Figure 6:
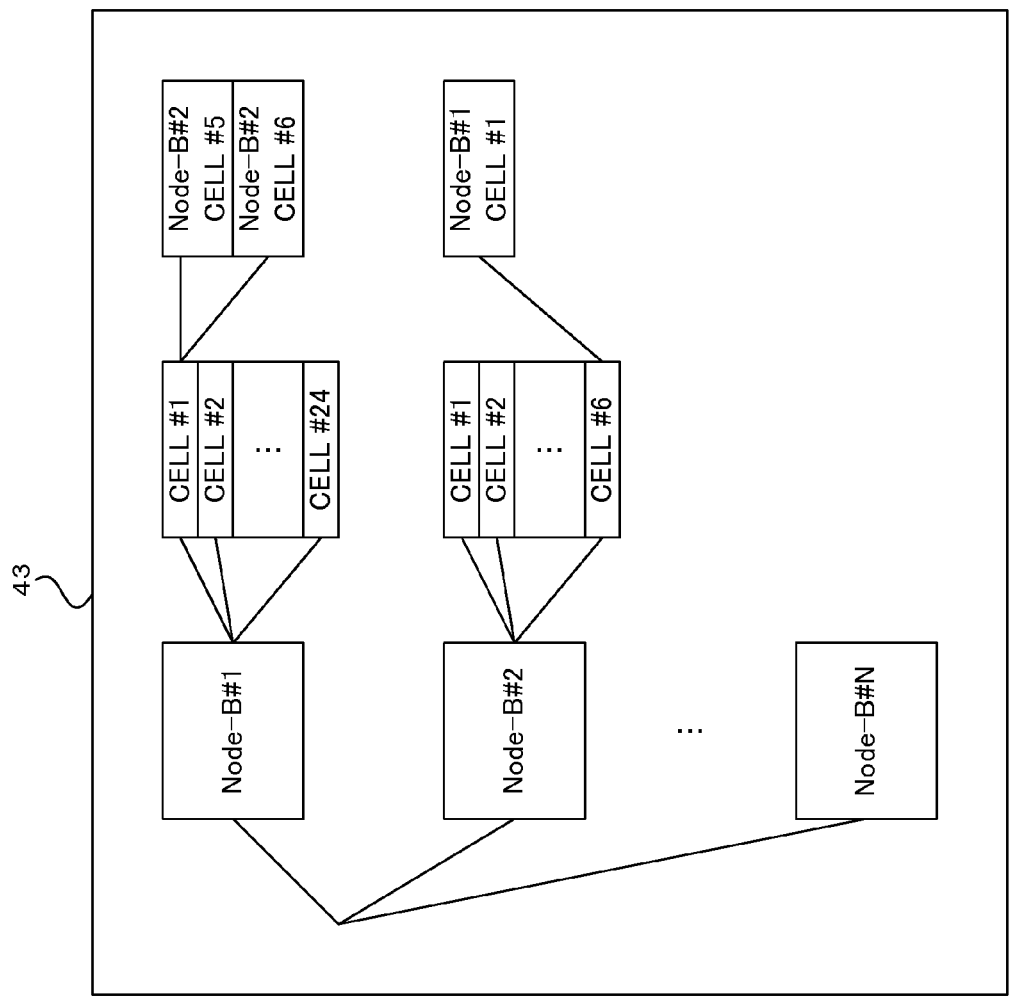
FIG. 6 is a diagrammatic view illustrating an example of data (neighboring cell information) in sectors neighboring state illustrated in FIG. 4.

The neighboring relationship (neighboring cell information) can be represented, for example, as such tree-structure data for which an address pointer or the like is used as illustrated in FIG. 6. In particular, in FIG. 6, it is represented by an association by an address pointer or the like that the cell #1 of the base station 20 of the base station number #1 neighbors with the cells #5 and #6 of the base station 20 of the base station number #2 while the cell #6 of the base station 20 of the base station number #2 neighbors with the cell #1 of the base station number #1. It is to be noted that the neighboring relationship of the cells of the same base station 20 is omitted in FIG. 6.

Figure 7:
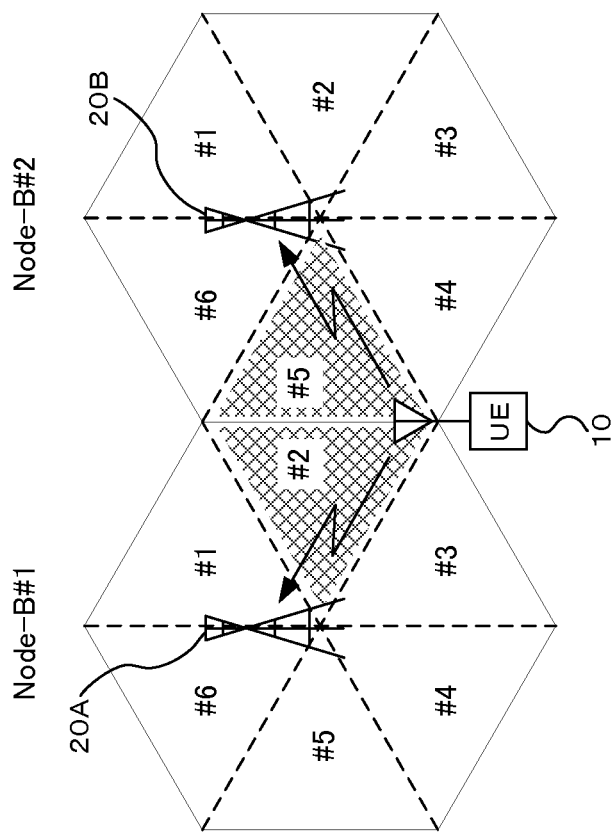
FIGS. 7 and 8 are diagrammatic views illustrating automatic production of data (neighboring cell information) in the sectors neighboring state illustrated in FIG. 4.
Figure 8:
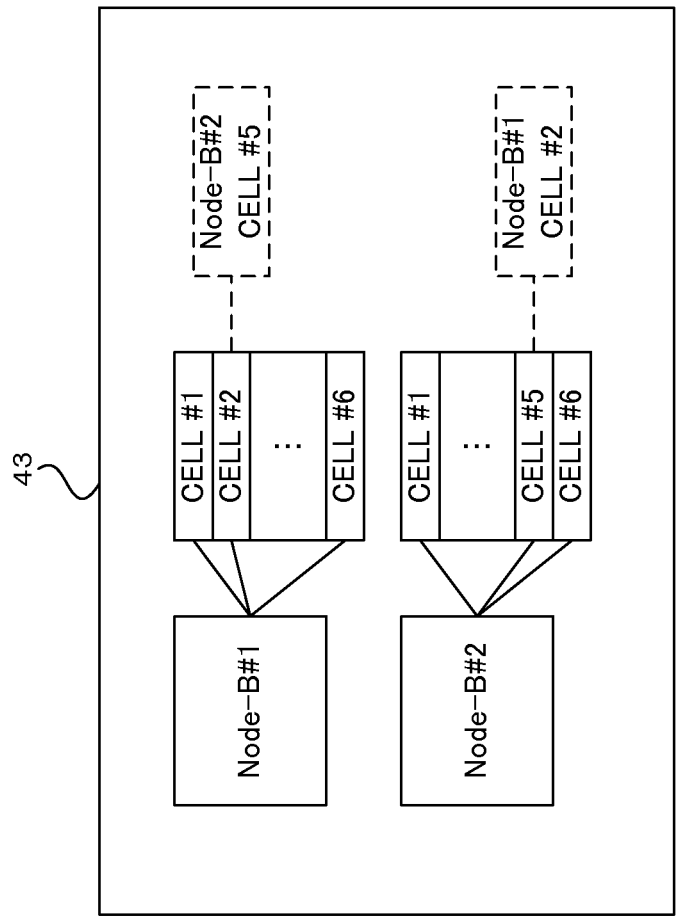

The neighboring cell information may be set and stored statically in advance upon system structuring or the like, or may be set and stored dynamically based on history information of wireless links formed in the past so that beforehand setting is not required. As one of implementation methods, for example, as illustrated in FIG. 7, if a handover request between the base stations 20A and 20B under the RNC 40 is received from the UE 10, then the RNC 40 may record the cells #2 and #5 between which handover is carried out as neighboring cells in the memory 44, for example, as indicated by a broken line in FIG. 8.

In particular, the RNC 40 may include a function as a neighboring cell information generating section for generating the neighboring cell information based on information of a wireless link formed between each cell (base station 20) and the UE 10 in the past and storing the generated information into the sectors neighboring state memory 43. The function may be mounted as a function of the EUL power controlling circuit 42 or may be mounted as a function separate from the circuit 42 on the RNC 40.

The EUL power controlling circuit 42 controls the EUL power in the cells (EUL-compatible cells) of the EUL-compatible base station 20A based on a result of the interference power monitoring by the interference power monitoring circuit 41.

For example, the EUL power controlling circuit 42 compares interference power regarding a certain cell (EUL-incompatible cell) of the EUL-incompatible base station 20B and monitored by the interference power monitoring circuit 41 with the threshold values P1 and P2. Then, if the interference power in the EUL-incompatible cell exceeds the interference power threshold value P1, then the EUL power suppression request circuit 42 searches for EUL-compatible cells neighboring with the EUL-incompatible cell in the sectors neighboring state memory 43 and produces an EUL power suppression request signal for the EUL-compatible cell and then transmits the signal to the EUL-compatible base station 20A which is a target. Further, if the interference power in the EUL-incompatible cell is lower than the interference power threshold value P2, then an EUL power suppression cancellation request signal is produced and transmitted to the EUL-compatible base station 20A which is a target.

In particular, the EUL power controlling circuit 42 in the present embodiment has a function as a specification section for specifying EUL cells neighboring with the EUL-incompatible cell in which the interference power exceeds the interference power threshold value P1 based on the neighboring cell information of the sectors neighboring state memory 43.

The memory 44 stores the threshold values P1 and P2, interference power monitoring results (interference power P3) upon EUL power suppression request signal transmission in the past, information necessary for operation of the interference power monitoring circuit 41 and the EUL power suppression request circuit 42 and so forth.

The interference power P3 in the past is used for comparison by the EUL power suppression request circuit 42 with the interference power (P) at present monitored later by the interference power monitoring circuit 41, and the guard period is adjusted in response to a result of the comparison. For example, if P≦P3, then it is decided that an interference suppression effect by transmission of the EUL power suppression request signal in the past has been obtained, and a guard period longer than that in the case of P>P3 is set. Consequently, a controlling process for delaying the next monitoring timing of the interference power can be carried out. It is to be noted that, by dividing the storage region, the memory 44 may be integrated with the sectors neighboring state memory 43.

Operation (EUL power suppression method) of the RNC 40 and the wireless communication system configured in such a manner as described above are described below with reference to FIGS. 9 to 14.

Figure 9:
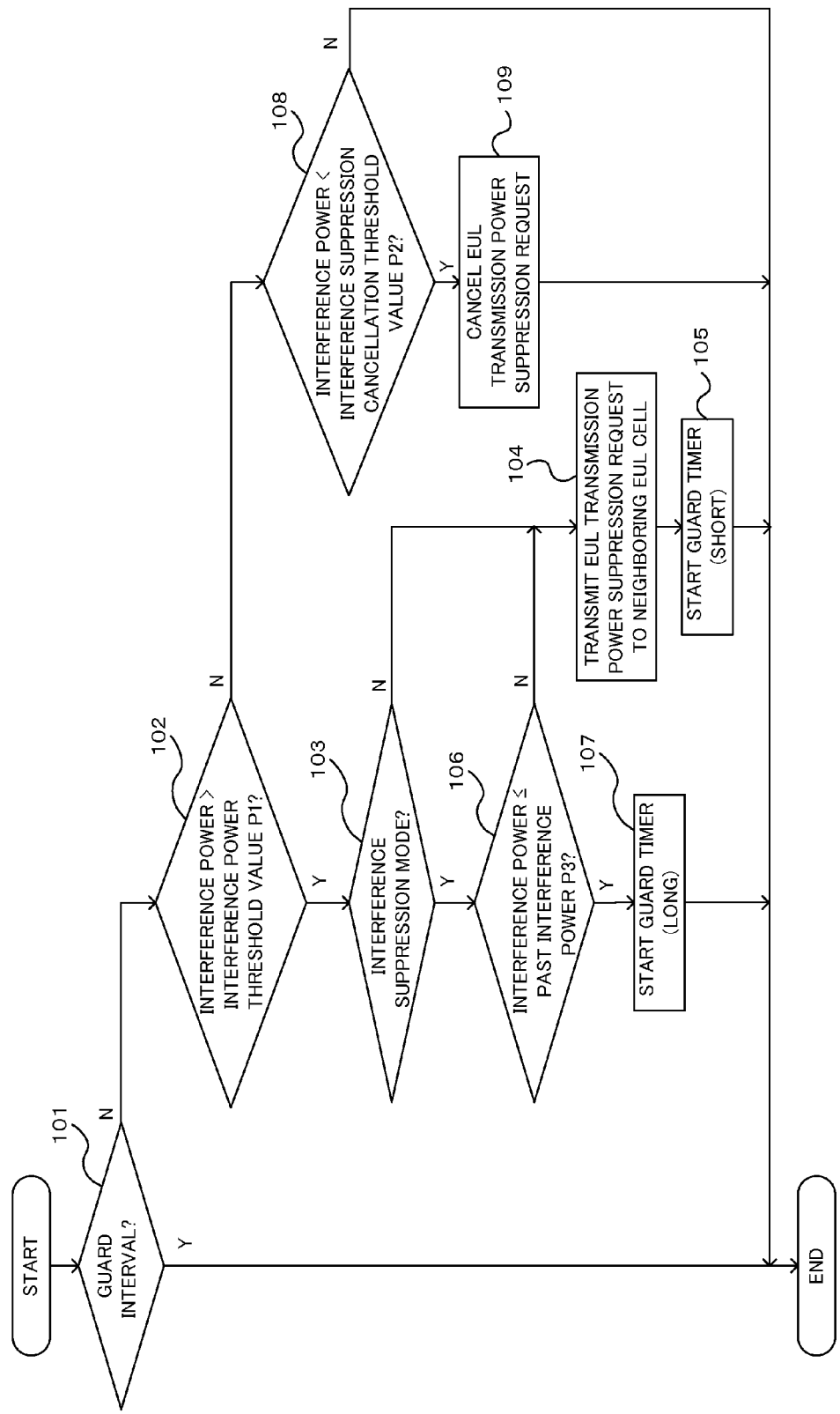
FIG. 9 is a flow chart illustrating an example of operation of the RNC illustrated in FIG. 4.

As illustrated in FIG. 9, the RNC 40 checks whether or not the present time is within a guard period by the guard timer function of the interference power monitoring circuit 41 (process 101). If the present time is without the guard period, then the interference power (total reception power of the cells in the base station 20) periodically reported from the under base stations 20 and the interference power threshold value P1 are compared with each other (process 102 from the N route of process 101).

As a result, if an EUL-incompatible cell wherein the interference power P exceeds the interference power threshold value P1 (P>P1) exists, then the interference power monitoring circuit 41 checks whether or not the present operation mode is an interference suppression mode (process 103 from the Y route of process 102). If the present operation mode is not the interference suppression mode, then the operation mode of the RNC 40 is switched to the interference suppression mode and a transmission instruction of the EUL power suppression request is given to the EUL power suppression request circuit 42.

Consequently, the EUL power suppression request circuit 42 searches for an EUL-compatible cell neighboring with the EUL-incompatible cell in which the interference power exceeds the interference power threshold value P1 from the sectors neighboring state memory 43 and then generates and transmits an EUL power suppression request signal for the EUL-compatible cell (process 104 from the N route of process 103). Transmission of the EUL power suppression request signal may be carried out one time or redundantly by a plural number of times within a fixed period. It is to be noted that interference power P which is a result of the monitoring at this time is stored as the interference power P3 into the memory 44.

Here, as the EUL power suppression request signal, a controlling signal for suppressing the EUL throughput of all of the EUL-compatible cells can be used for the EUL-compatible base station 20A. At this time, the EUL power of the UEs 10 existing in the EUL-compatible cells can be suppressed uniformly.

As an example of such a controlling signal (information element: IE) as described above, the "Maximum Target Received Total Wide Band Power" and the "Reference Received Total Wide Band Power" prescribed in 3GPP TS 25.433 V7.5.0 (2007-06) are available.

Figure 10:
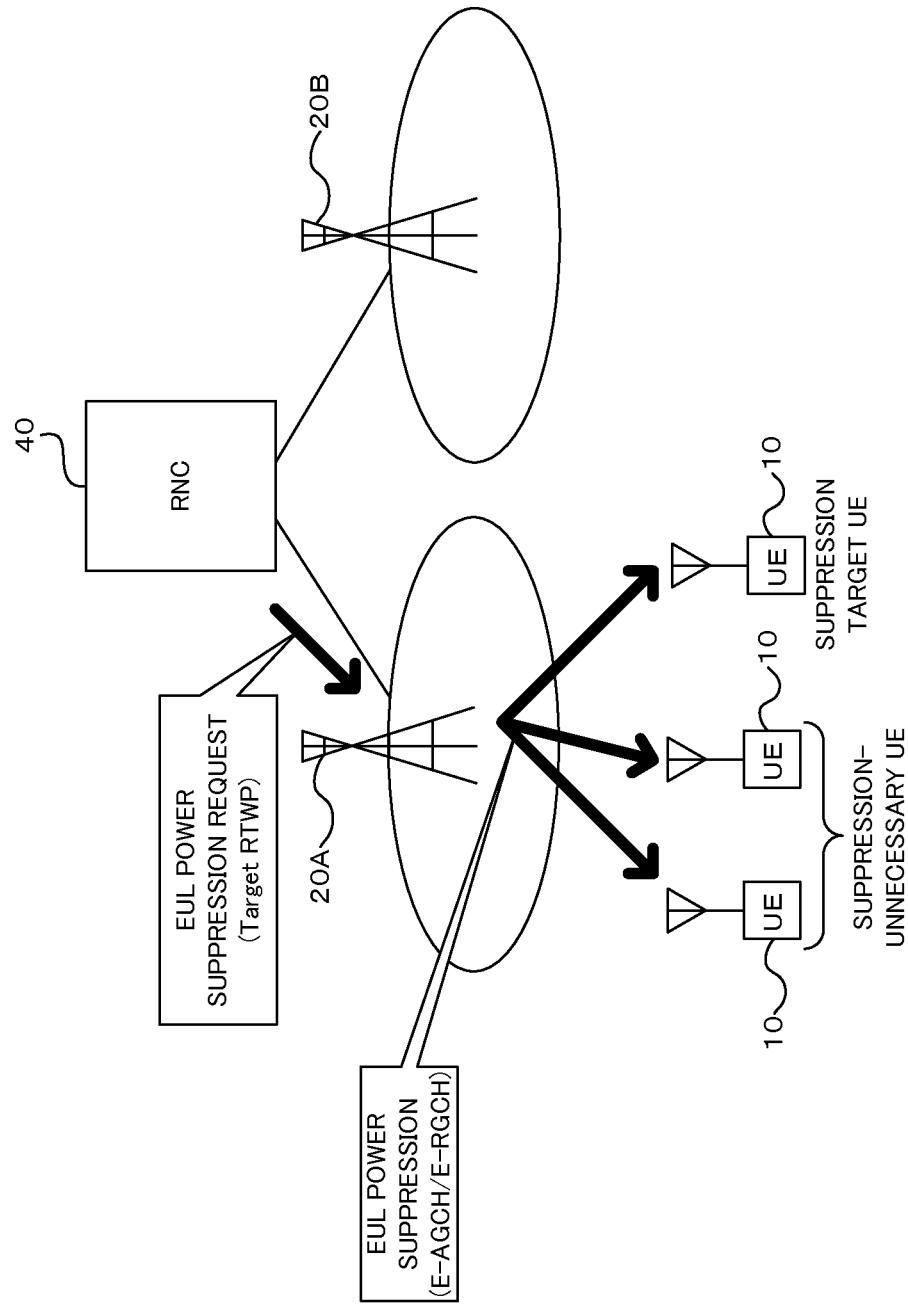
FIG. 10 is a schematic view illustrating an EUL power controlling method in the wireless communication system illustrated in FIG. 1.

By suppressing (limiting) the total EUL power (total transmission power of the UL) which can be used for (allocated to) the EUL-compatible cells by the EUL-compatible base station 20A from the RNC 40 by the controlling signal, for example, as schematically illustrated in FIG. 10, the power amount which can be allocated to the UE 10 in accordance with the EUL scheduling by the EUL-compatible base station 20A is inclined to decrease uniformly. Further, while there is the possibility that the EUL throughput in the EUL-compatible cells may decrease, it can be anticipated that the interference power arising from the EUL is suppressed with high probability.

It is to be noted that, since a certain period of time is required before the EUL power suppression request signal is received by the EUL-compatible base station 20A and EUL power control operates (the signal is reflected), preferably the interference power monitoring circuit 41 sets a fixed guard period using the guard timer function after state transition to the interference suppression mode occurs and monitoring of the interference P is not carried out and also the state transition is not carried out during setting (Y route of process 101, process 105).

Thereafter, if the guard period ends, then the interference power monitoring circuit 41 starts monitoring of the interference power P again (N route of process 101), and checks weather or not the interference power of any EUL-incompatible cell whose interference power P exceeds the interference power threshold value P1 still exceeds the interference power threshold value P1 (process 102).

If the interference power P exceeds the threshold value P1, then the interference power monitoring circuit 41 checks whether or not the present mode is the interference suppression mode (process 103 from the Y route of process 102). However, in this instance, since the present mode has changed already to the interference suppression mode, the interference power monitoring circuit 41 compares the interference power P at present and the interference power P3 in the past stored in the memory 44 with each other (process 106 from the Y route of process 103).

If, as a result of the comparison, the interference power P at present exceeds the interference power P3 in the past (P>P3: N route of process 106), the interference power monitoring circuit 41 decides that the EUL power suppression effect by the previously transmitted EUL power suppression request signal is insufficient. Then, the interference power monitoring circuit 41 provides an transmission instruction of the EUL power suppression request to the EUL power suppression request circuit 42 (process 104) again to cause the EUL power suppression request circuit 42 to transmit the EUL power suppression request signal (process 105).

On the other hand, if the interference power P at present is equal to or lower than the interference power P3 in the past (P≦P3) (Y route of process 106), then the interference power monitoring circuit 41 decides that the EUL power suppression effect is achieved by the previously transmitted the EUL power suppression request signal. Then, for example, the interference power monitoring circuit 41 sets a guard period (long cycle guard period) longer than the guard period at the process 105, and does not carry out monitoring of the interference power P and also state transition within the set period (process 107, Y route of process 101).

By the setting of the long cycle guard period, it can be decided that, if the interference suppression mode continues for more than fixed time, then the interference power does not originate from the EUL and the effect by suppression of the EUL power is poor, and therefore, wrong decision can be reduced. It is to be noted, however, that it is also possible to omit the process 106 and process 107.

Thereafter, if the guard period ends, then the interference power monitoring circuit 41 starts monitoring of the interference power P again (N route of process 101), and checks whether or not the interference power P regarding the cell which has transmitted the EUL power suppression request signal still exceeds the interference power threshold value P1 (process 102).

If the interference power P at present is equal to or lower than the interference power threshold value P1 (P≦P1), then the interference power monitoring circuit 41 further checks whether or not the interference power P at present is lower than the interference suppression cancellation threshold value P2 (process 108 from the N route of the process 102).

If the interference power P at present is lower than the interference suppression cancellation threshold value P2 (P<P2), then the interference power monitoring circuit 41 changes in state from the interference suppression mode to the normal mode and causes the EUL power suppression request circuit 42 to produce and transmit an EUL power suppression cancellation request signal regarding the target EUL-compatible cell (process 109 from the Y route of process 108). Also the cancellation request signal may be transmitted once or transmitted redundantly by a plural number of times within the fixed time.

If the interference power P at present is equal to or higher than the interference suppression cancellation threshold value P2 (P≧P2), then the interference power monitoring circuit 41 continuously maintains the present mode (N route of process 108). It is to be noted that it is also a possible idea to decide, where the normal mode continues for more than the fixed time, that the wireless resource has some room, and to transmit the EUL transmission power suppression cancellation request to the target EUL-compatible cell. Further, while the process 108 implements a hysteresis process in order to prevent frequent occurrence of state transition between the normal mode and the interference suppression mode, the process 108 can be also omitted.

As described above, with the present embodiment, even if the interference power for EUL communication received from an EUL-compatible cell provided by the EUL-compatible base station 20A cannot be correctly detected in an EUL-incompatible cell provided by the EUL-incompatible base station 20B, the interference power of the EUL-incompatible cell can be monitored by the RNC 40 which is an upper level network apparatus so that the EUL power in the EUL-compatible cell is suppression controlled. Accordingly, quality degradation relating to the existing services in the EUL-incompatible cell can be suppressed.

[2] First Modification

Figure 11:
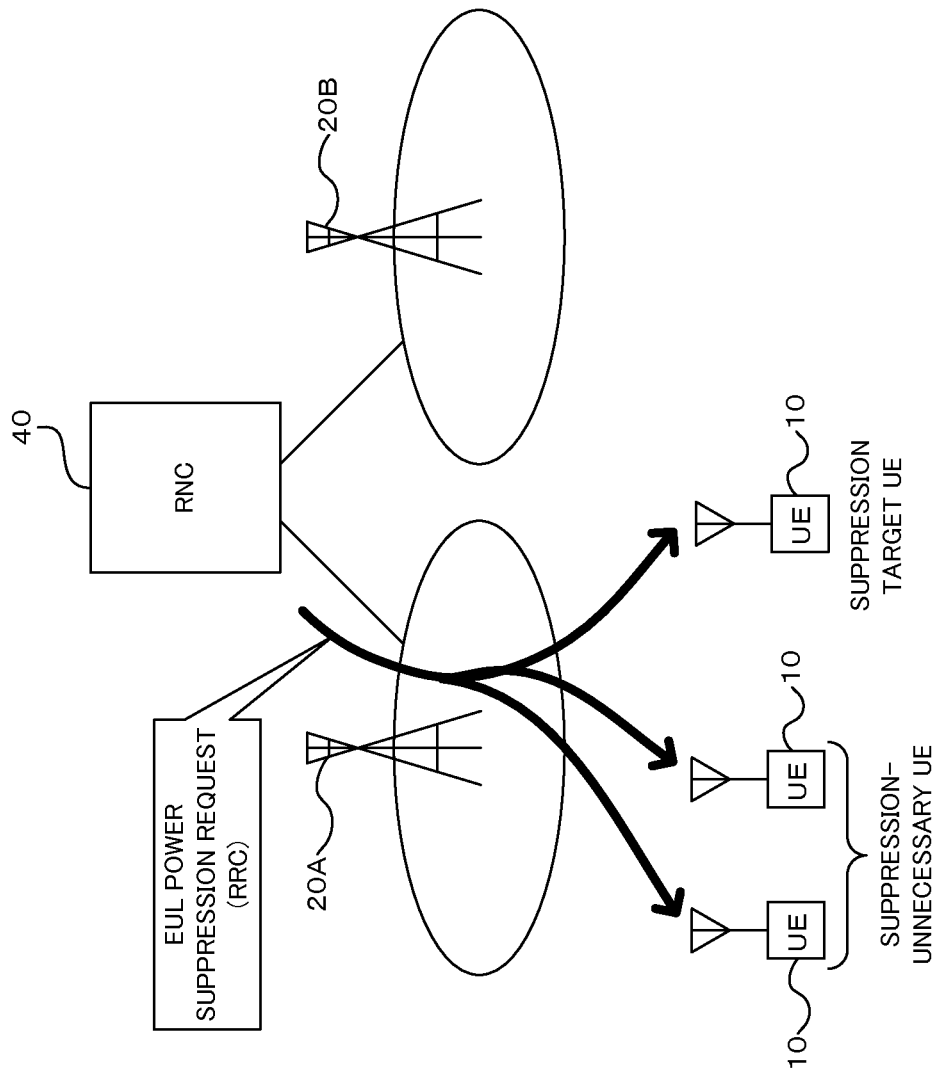
FIG. 11 is a schematic view illustrating a first modification to the EUL power controlling method illustrated in FIG. 10.

The RNC 40 (EUL power controlling circuit 42) can also use a controlling signal which can be commonly received through the EUL-compatible base station 20A by the UEs 10 existing in the EUL-compatible cell, for example, a wireless resource controlling (RRC: Radio Resource Control) signal, as the EUL power suppression request signal in the interference suppression mode, for example, as schematically illustrated in FIG. 11.

In this instance, the EUL power of all of the UEs 10 existing in the EUL-compatible cells including the UEs 10 in which the interference power is not applied to neighboring EUL-incompatible cells and suppression of the EUL power is unnecessary may be suppression controlled together. With the present method, the EUL power of the UEs 10 can be directly suppressed without depending upon the UL scheduling process in the EUL-compatible base station 20A.

[3] Second Modification

Figure 12:
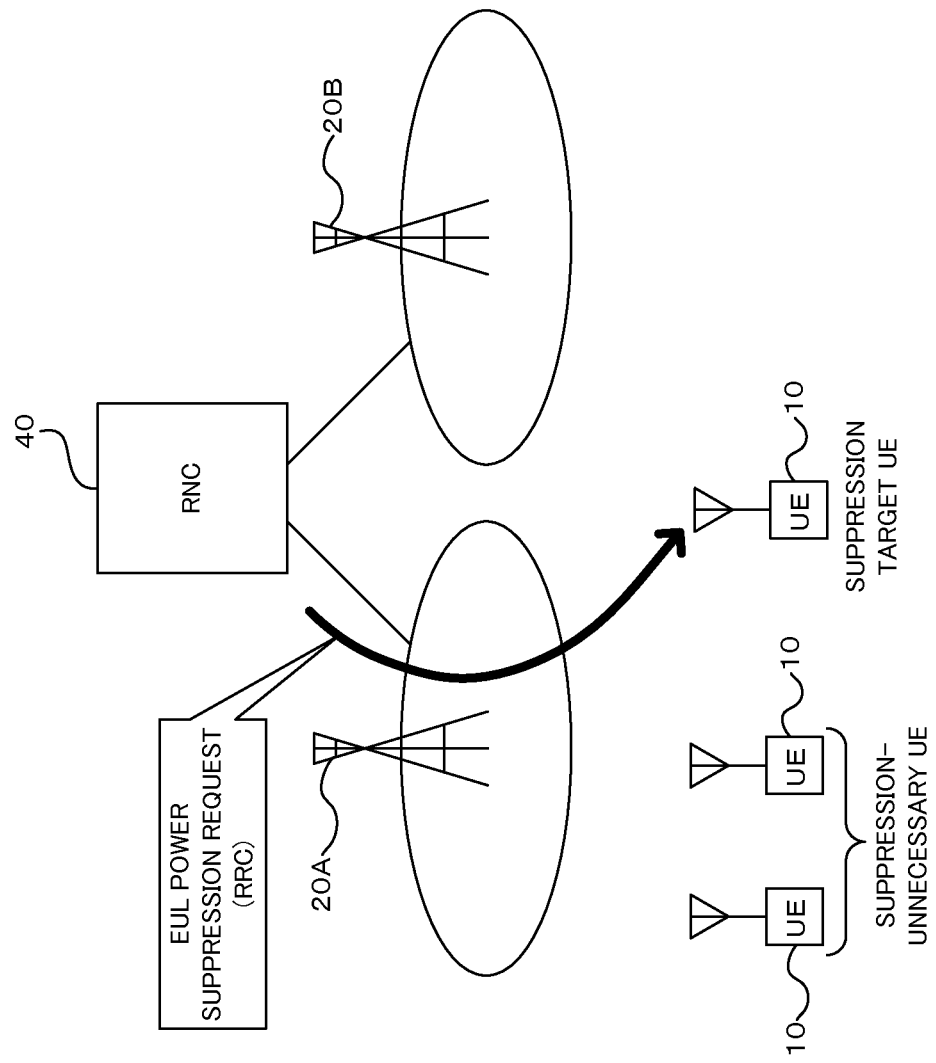
FIG. 12 is a schematic view illustrating a second modification to the EUL power controlling method illustrated in FIG. 10.

The RNC 40 (EUL power controlling circuit 42) can also selectively suppression control, in the interference suppression mode, the EUL power of the UEs 10 existing in the EUL-compatible cell through the EUL-compatible base station 20A, for example, as illustrated in FIG. 12, using individual controlling signals (for example, RRC signals) as the EUL power suppression request signals described hereinabove to the UEs 10.

Here, it is preferable to select, as a UE 10 which is a target of the EUL power suppression control, a UE 10 which is positioned in the proximity of the boundary between cells and actually causes interference. In this instance, the RNC 40 estimates the UE 10 which actually makes a cause of interference. While various methods can be applied as an estimation method, for example, a method can be used wherein the position of the UE 10 is estimated based on RTT (Round Trip Time) reported from the base station 20. It is to be noted that, while an implementation method of the estimation function on the RNC 40 is freely selected, for example, the implementation method may be incorporated in the EUL power controlling circuit 42.

[4] Third Modification

Figure 13:
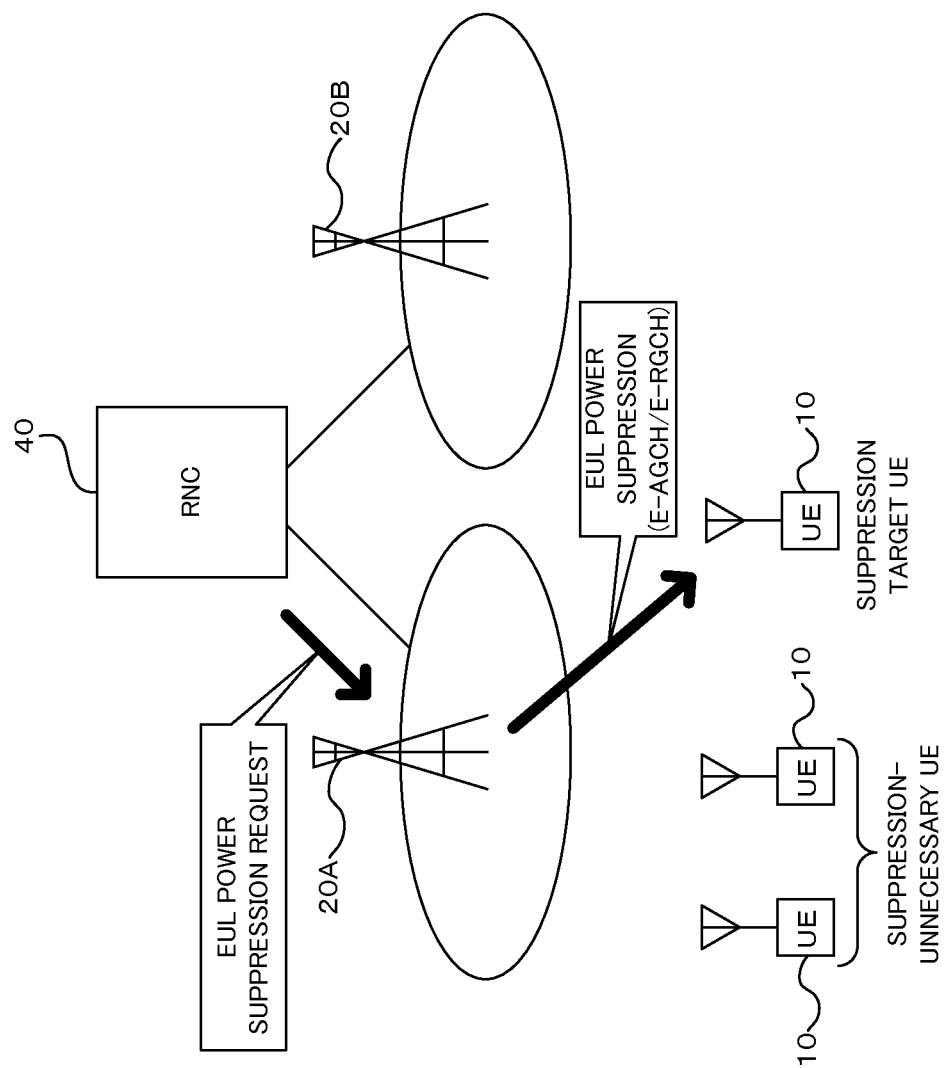
FIG. 13 is a schematic view illustrating a third modification to the EUL power controlling method illustrated in FIG. 10.

The RNC 40 (EUL power controlling circuit 42) may transmit, for example, as schematically illustrated in FIG. 13, a notification of a suppression request of the EUL power to the EUL-compatible base station 20A such that the EUL-compatible base station 20A autonomously selects a UE 10 which is a target of the UE power suppression and then individually suppression control the EUL transmission power of the UE 10.

Figure 14:
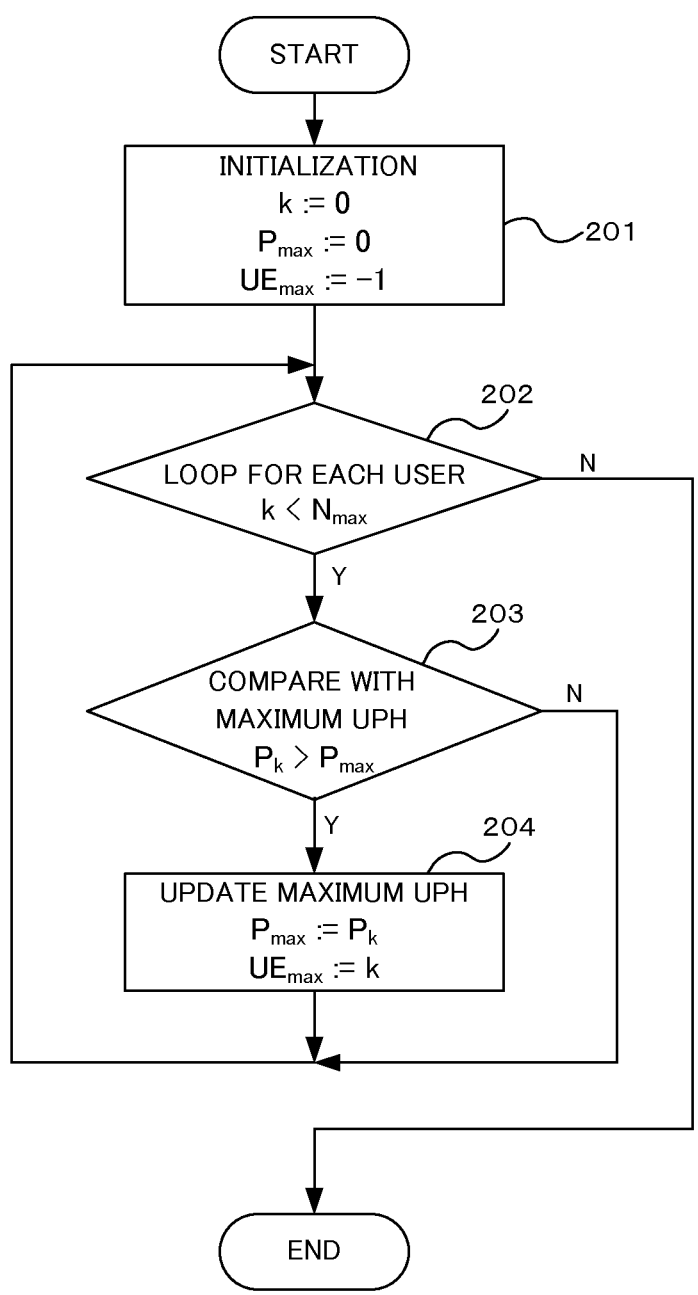
FIG. 14 is a flow chart illustrating a searching process of an EUL power suppression target user by the RNC of the third modification.

Also in this instance, as the UE 10 of an EUL power suppression controlling target, it is preferable to select (estimate) a UE 10 which is positioned in the proximity of the boundary between cells and actually makes a cause of interference. As an estimation method therefore, for example, not only a method wherein the position of the UE 10 is estimated based on the RTT (Round Trip Time) but also a method wherein pilot transmission power of the UEs 10 is measured utilizing UPH (UE power headroom) reported from each UE 10 to the base station 20 and a UE 10 having high pilot transmission power is estimated as a UE 10 positioned in the proximity of the cell boundary are available.

Where the latter method is applied, in the EUL-compatible base station 20A, for example, the EUL scheduler 30A (refer to FIG. 3) operates in accordance with the flow chart (processes 201 to 204) illustrated in FIG. 14, and as a result, it is estimated (determined) that the UE 10 which reports a maximum UPH is searched out and that the UE 10 is a UE 10 which is positioned in the proximity of the cell boundary and is an EUL power suppression target.

In particular, if the EUL scheduler 30A is started up, then the EUL scheduler 30A first initializes parameters k, $p_{max}$, and $UE_{max}$ (k=0, $P_{max}$=0, and $UE_{max}$=−1) as illustrated in FIG. 14 (process 201). Here, k, $P_{max}$, and $UE_{max}$ represent a number of the UE, maximum UPH (maximum pilot transmission power), and a number of the UE which has reported the maximum UPH, respectively.

Then, the EUL scheduler 30A checks whether or not an updating process hereinafter described is completed regarding all of the UEs 10 existing in the EUL-compatible cell (k<$N_{max}$, where $N_{max}$ is a maximum number of UEs existing in the EUL-compatible cell) (process 202). If the updating process is not completed, then, regarding the UE 10 whose UE number is k, the reported UPH (pilot transmission power) $P_k$ and the maximum UPH (maximum pilot transmission power) $P_{max}$ are compared with each other (process 203 from the Y route of process 202).

If $P_k$>$P_{max}$ as a result of the comparison, then the EUL scheduler 30A updates the maximum UPH and the number of the UE which has reported the UPH as $P_{max}$=$P_k$, and $UE_{max}$=k (process 204 from the Y route of process 203), respectively. On the other hand, if $P_k$≦$P_{max}$, then the EUL scheduler 30A does not carry out the updating process (N route of process 203).

The EUL scheduler 30A repetitively carries out the process described above before the process is completed regarding all of the UEs 10 existing in the EUL-compatible cell (k becomes equal to $N_{max}$ in process 202). If the process is completed, then it is estimated (determined) at this point that the UE 10 which has reported $P_{max}$ (maximum UPH) and has the UE number k from the $N_{max}$ UEs 10 is a UE 10 which is positioned in the proximity of the cell boundary and is an interference source.

Then, the EUL scheduler 30A carries out scheduling for the UE 10 such that EUL power is decreased and transmits a result of the scheduling (EUL scheduling information) to the target UE 10 through a physical channel such as an E-AGCH, an E-RGCH or the like (refer to FIG. 13). Consequently, the EUL transmission power of the UE 10 is suppressed and interference with the EUL-incompatible cell is suppressed.

[5] Others

It is to be noted that, while the example where monitoring of the interference power and suppression of the EUL power are carried out in a unit of a cell is described in the foregoing description of the embodiment, the monitoring of the interference power and the suppression of the EUL power may be carried out in a unit of a group which includes a plurality of cells or in a unit of a sector where one cell is divided into a plurality of sectors such as, for example, three sectors, six sectors or the like. Further, it is not impossible to carry out the monitoring of the interference power and the suppression of the EUL power in a unit of a wireless zone formed by the base station irrespective of the cell or sector configuration.

With the method for controlling the uplink power in the wireless communication system and the apparatus in the wireless communication system, also where both of a wireless base station (cell) which supports a specific wireless channel and another wireless base station (cell) which does not support the specific wireless channel exist in a mixed manner, interference of a neighboring cell can be suppressed appropriately.

Further, also it is possible to enhance the communication quality of an uplink by interference suppression of neighboring cells.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments have been described in detail, it should be understood that the various changes, substitutions, and alterations could be made hereto without departing from the spirit and scope of the invention.

What is claimed is:

1. A method for controlling an uplink power in a wireless communication system which includes a wireless terminal, a first wireless base station, a second wireless base station which supports a wireless channel which is not supported by the first wireless base station, and an upper level apparatus which accommodates the first and second wireless base stations, the method comprising:
   on the upper level apparatus,
   monitoring interference power in the first wireless base station; and
   carrying out, where a result of the monitoring exceeds a predetermined threshold value, suppression control of transmission power of the wireless terminal which communicates with the second wireless base station using the wireless channel which is not supported by the first wireless base station, wherein
   the monitoring of the interference power is carried out in a unit of a first cell where a wireless zone formed by the first wireless base station is divided into such first cells, and
   the wireless terminal which is a target of the suppression control exists in a cell which is a second cell where a wireless zone formed by the second wireless base station is divided into such second cells and neighbors with the first cell in which the result of the monitoring exceeds the predetermined threshold value.

2. The method for controlling an uplink power in a wireless communication system according to claim 1, wherein the upper level apparatus retains information regarding neighboring situations of the cells formed by the first and second wireless base stations, and
   specifies, based on the information, the second cell which neighbors with the first cell within which the result of the monitoring exceeds the predetermined threshold value.

3. The method for controlling an uplink power in a wireless communication system according to claim 2, wherein the upper level apparatus produces information regarding the neighboring situations based on information of wireless links formed between the wireless base stations and the wireless terminal in the past.

4. The method for controlling an uplink power in a wireless communication system according to claim 1, wherein monitoring of the interference power is carried out based on reception power information of each of the first cells reported from the first wireless base station.

5. The method for controlling an uplink power in a wireless communication system according to claim 1, wherein the suppression control is control for limiting the total transmission power of uplinks which can be allocated to the wireless terminals existing in the second cells by the second wireless base station from the upper level apparatus to reduce transmission power of the uplinks allocated to the wireless terminals.

6. The method for controlling an uplink power in a wireless communication system according to claim 1, wherein the suppression control is carried out by transmitting a common controlling signal or an individual controlling signal to the wireless terminal existing in the second cell from the upper level apparatus to the second cell through the second wireless base station.

7. The method for controlling an uplink power in a wireless communication system according to claim 6, wherein the wireless terminal to which the individual controlling signal is to be transmitted is a wireless terminal which exists in the second cell and positioned in the proximity of a boundary with the first cell.

8. The method for controlling an uplink power in a wireless communication system according to claim 7, wherein the wireless terminal positioned in the proximity of the boundary is estimated by the upper level apparatus or the second wireless base station based on a signal transmitted from the wireless terminal existing in the second cell.

9. An apparatus in a wireless communication system which includes a wireless terminal, a first wireless base station, a second wireless base station which supports a wireless channel which is not supported by the first wireless base station, and said apparatus which accommodates the first and second wireless base stations, the apparatus comprising:
a monitor that monitors interference power in the first wireless base station; and
a controller that carries out, where a result of the monitoring by said monitor exceeds a predetermined threshold value, suppression control of transmission power of the wireless terminal which communicates with the second wireless base station using the wireless channel which is not supported by the first wireless base station, wherein
said monitor carries out the monitoring of the interference power in a unit of a first cell where a wireless zone formed by the first wireless base station is divided into such first cells, and
said controller selects, as the wireless terminal which is a target of the suppression control, a wireless terminal which exists in a cell which is a second cell where a wireless zone formed by the second wireless base station is divided into such second cells and neighbors with the first cell in which the result of the monitoring exceeds the predetermined threshold value.

10. The apparatus in a wireless communication system according to claim 9, wherein said controller includes:
a memory that retains information regarding neighboring situations of the cells formed by the first and second wireless base stations; and
a specifying unit that specifies, based on the information retained in said memory, the second cell which neighbors with the first cell within which the result of the monitoring exceeds the predetermined threshold value.

11. The apparatus in a wireless communication system according to claim 9, wherein said controller further includes a neighboring cell information production unit that produces information regarding the neighboring situations based on information of wireless links formed between the wireless base stations and the wireless terminal in the past and that stores the produced information into said memory.

12. The apparatus in a wireless communication system according to claim 9, wherein said monitor carries out monitoring of the interference power based on reception power information of the first cells reported from the first wireless base station.

13. The apparatus in a wireless communication system according to claim 9, wherein said controller limits the total transmission power of uplinks which can be allocated to the wireless terminals existing in the second cells by the second wireless base station to carry out the suppression control of the transmission power of the uplinks allocated to the wireless terminals.

14. The apparatus in a wireless communication system according to claim 9, wherein said controller carries out the suppression control by transmitting a common controlling signal or an individual controlling signal to the wireless terminal existing in the second cell to the second cell through the second wireless base station.

15. The apparatus in a wireless communication system according to claim 14, wherein said controller selects, as the wireless terminal to which the individual controlling signal is to be transmitted, a wireless terminal which exists in the second cell and positioned in the proximity of a boundary with the first cell.

16. The apparatus in a wireless communication system according to claim 15, wherein said controller estimates the wireless terminal positioned in the proximity of the boundary based on a signal transmitted from the wireless terminal existing in the second cell.

* * * * *